United States Patent Office 3,324,202
Patented June 6, 1967

3,324,202
PHOSPHORUS-CONTAINING POLYOLS
Borivoj R. Franko-Filipasic, Lower Makefield Township, Bucks County, Pa., assignor to FMC Corporation, New York, N.Y., a corporation of Delaware
No Drawing. Filed July 9, 1963, Ser. No. 293,854
5 Claims. (Cl. 260—920)

This invention relates to phosphorus-containing polyols, and more particularly it relates to novel phosphorus-containing polyols, the method of preparing them, and flame-retardant polyurethane compositions derived therefrom.

There has been much investigation in recent years of flame-retardant polyurethane compositions which can be used as foams, coatings and castings for applications in which heat or fire is a hazard. It has been suggested, for example, that some degree of flame resistance can be achieved by incorporating a liquid or solid flame-retarding additive into the formulation. However, liquid flame retardants are either incompatible with the composition or have a plasticizing action which degrades the properties of the composition. Moreover, liquid additives tend to be lost over a period of time through bleeding and volatilization, thus resulting in a decreasing degree of flame retardance as the composition ages. On the other hand, solid flame retardants tend to embrittle the polyurethane composition. Furthermore, none of these additives has been completely satisfactory in imparting a high degree of flame retardance to polyurethane compositions.

It is an object of this invention to provide phosphorus-containing polyols which are useful as intermediates in the preparation of flame-retardant polyurethane compositions.

Another object is to provide phosphorus-containing polyether polyols.

Still another object is to provide phosphorus-containing polyester polyols.

A further object is to provide a novel method of preparing phosphorus-containing polyols.

Still another object is to provide flame-retardant polyurethane compositions in which no flame-retarding additive is required.

These and other objects will become apparent from the following description of this invention.

The novel phosphorus-containing polyols of this invention which are useful in the preparation of flame-retardant polyurethane compositions are the transesterification products of (1) a liquid polyol having an average molecular weight of about 200–5,000 and containing an average of at least 3 hydroxyl groups per molecule, and (2) a tris(hydroxyalkyl) phosphate of the formula $$O=P[O(RD)_nH]_3$$

in which R is an alkylene radical of the group consisting of ethylene, propylene, chloropropylene, bromopropylene, and butene and $n$ is 1.4–2.5, said transesterification product containing at least 2% by weight phosphorus and having a viscosity of less than 4,000 poises at 25° C.

The phosphorus-containing polyols of this invention react with aromatic polyisocyanates to form polyurethane compositions having flame-retardant properties ranging from self-extinguishing to non-burning. In addition to phosphorus, the polyurethane composition should also contain halogen, either by its presence in the phosphorus-containing polyol or in a chlorinated aromatic diisocyanate, or both. The flame-retardance of the polyurethane composition will vary depending upon the amount of phosphorus and halogen present.

The high molecular weight polyols which may be used in the preparation of the novel phosphorus-containing intermediates of this invention are the commercially available liquid polyols containing at least 3 hydroxyl groups per molecule which are conventionally used in the preparation of polyurethane compositions. These polyols have average molecular weights of 200–5,000.

A preferred class of high molecular weight polyols includes the liquid polyether polyols derived from the reaction of a polyol selected from the group consisting of polyhydroxyalkanes of 3–6 hydroxyl groups and 3–6 carbon atoms and carbohydrates of 5–8 hydroxyl groups and 5–12 carbon atoms with an alkylene oxide of 2–4 carbon atoms. Illustrative examples of suitable polyhydroxyalkanes include glycerol, trimethylolethane, trimethylolpropane, 1,2,6 - hexanetriol, pentaerythritol, sorbitol and others. Suitable carbohydrates include pentoses and hexoses and their disaccharides such as fructose, sucrose and dextrose, as well as many others. Examples of suitable alkylene oxides include oxirane compounds such as ethylene oxide, propylene oxide, epichlorohydrin, epibromohydrin, and butene oxide. Based upon cost, availability and hydrolytic stability of the final product, propylene oxide is preferred.

Polyether polyols are formed by the reaction of at least one equivalent weight of alkylene oxide with each hydroxyl equivalent weight of polyol; 1 epoxy oxygen group being equivalent to 1 hydroxyl group. Thus, the condensation product contains 1 ether linkage and 1 hydroxyl group for each hydroxyl group originally present in the polyol. If more than 1 equivalent of alkylene oxide is reacted with each equivalent of polyol, then the polyether polyol will contain more than 1 ether linkage for each hydroxyl group. The condensation of a hydroxyl group with propylene oxide is illustrated by the following equation:

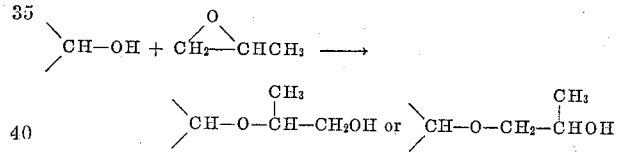

in which either of the indicated products may be formed. Thus, within a single polyol molecule some hydroxyl groups may condense to give 1 product, while 1 or more may condense to give the other. When more than 1 equivalent of alkylene oxide is present for each equivalent of polyol, the excess alkylene oxide condenses with the generated hydroxyl group, thereby increasing the molecular weight of the polyether polyol and the number of possible isomers. The molecular weight of the polymer polyol should be in the range of about 200–5,000, and preferably about 400–2,000.

Another class of high molecular weight polyols which may be used in the preparation of the novel phosphorus-containing polyols of this invention includes liquid polyester polyols which are hydroxyl-terminated polyesters derived from the reaction of dicarboxylic acids and polyols of 2–4 hydroxyl groups. Illustrative examples of suitable dicarboxylic acids include maleic, chloromaleic, dichloromaleic, succinic, adipic, phthalic, isophthalic, sebacic, chlorendic, and mixtures thereof, as well as many other dicarboxylic acids. Examples of suitable polyols include ethylene glycol, diethylene glycol, polyethylene glycol, propylene glycol, dipropylene glycol, polypropylene glycol, glycerol, trimethylolethane, trimethylolpropane, 1,2,6-hexanetriol and pentaerythritol, as well as other polyols of 2–4 hydroxyl groups. The polyol component may be a single polyol or it may be a mixture of 2 or more polyols of 2–4 hydroxyl groups. Since the polyester polyol must contain an average of at least 3 hydroxyl groups per molecule, the polyol component must contain at least some polyol of 3–4 hydroxyl groups.

Polyester polyols are formed by the reaction of more than 1, but not more than 2 hydroxyl equivalent weights of polyol with each carboxyl equivalent weight of dicarboxylic acid; 1 hydroxyl group being equivalent to 1 carboxyl group. The acid number of the polyester polyol should not be in excess of about 20, and preferably it is not in excess of about 10. The hydroxyl number should be in the range of about 100–700, and preferably about 300–650. The polyester polyol should have an average of at least 3 hydroxyl groups per molecule, and preferably at least 4. The number of hydroxyl groups per molecule is readily calculated from the hydroxyl number and the molecular weight in accordance with the formula:

$$\text{Hydroxyl number} = \frac{\text{functionality} \times 56{,}100}{\text{molecular weight}}$$

The molecular weight should be in the range of about 200–5,000, and preferably about 500–2,000.

Polyester polyols are prepared by conventional esterification techniques such as by reacting the polyol and diacid at elevated temperatures in the presence, or absence, of an acid catalyst. The general procedure is to start the reaction at a relatively low temperature, such as 80° C., and then raise the temperature to about 160° C. over the first 2 or 3 hours of heating. The temperature is then raised more slowly to about 200° C. or more, while removing water as formed. The heating is continued until the desired acid number is reached.

The tris(hydroxyalkyl) phosphates which are transesterified by these high molecular weight polyols to form the novel intermediates of this invention are those having the formula $O=P[O(RO)_nH]_3$ in which R is an alkylene radical of 2–4 carbon atoms selected from the group consisting of ethylene, propylene, chloropropylene, bromopropylene, and butene and $n$ is 1.4–2.5. These phosphates are prepared by reacting 1 mole of phosphoric acid with at least 4 moles of an alkylene oxide of 2–4 carbon atoms. Suitable alkylene oxides include ethylene oxide, propylene oxide, epichlorohydrin, epibromohydrin, and butene oxide. The neutralization of phosphoric acid with ethylene oxide is illustrated by the following equation:

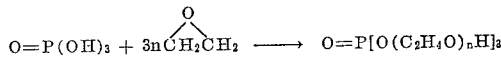

After 3 moles of alkylene oxide have condensed with each mole of phosphoric acid, the excess alkylene oxide condenses with the generated hydroxyl group, thereby increasing the molecular weight of the phosphate.

The reaction of phosphoric acid and alkylene oxide can be carried out in the presence of a solvent, such as dioxane, or in the absence of solvent. When large amounts of solvent are used, neutral products, in which $n$ equals about 1.4, can be obtained; without solvent, $n$ is generally in the range of about 2–2.5 in order to obtain a neutral product. The reaction is exothermic, and generally takes place at temperatures from about room temperature to 100° C. The preparation of these phosphate esters is fully taught by Adams and Shoemaker in U.S. Patent No. 2,372,344.

The transesterification of the tris(hydroxyalkyl)phosphate with the high molecular weight polyol is carried out by reacting the phosphate and polyol at elevated temperatures thereby forming a phosphorus-containing polyol and a by-product glycol. The reaction of a hydroxyl group with the phosphate is illustrated by the following equation:

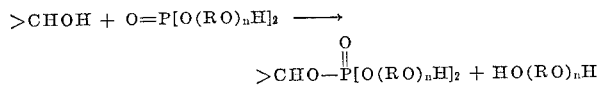

The degree of transesterification is readily controlled by the amount of tris(hydroxyalkyl) phosphate present. The phosphate should be present in an amount sufficient to provide at least about 2% phosphorus in the phosphorus-containing polyol. In most cases, an equimolar amount of phosphate and high molecular weight polyol will provide more than this minimum phosphorus requirement. Since transesterification of the high molecular weight polyol actually increases the hydroxyl functionality of the polyol, more than 1 mole of phosphate may be employed per mole of high molecular weight polyol, if desired. Preferably, no more than about 2 moles of tris(hydroxyalkyl) phosphate are reacted with each mole of high molecular weight polyol. Since transesterification results in an increase in the viscosity of the high molecular weight polyol, the degree of transesterification should be limited so that the viscosity of the product is less than about 4,000 poises at 25° C. and preferably less than about 1,000 poises.

The transesterification reaction used to prepare the novel products of this invention is also suitable for preparing phosphorous-containing polyols derived from simple phosphate esters of the formula $O=P(OR'X_m)_3$ in which X is a halogen of the group consisting of chlorine and bromine, $m$ is 0–4, and $R'X_m$ is an organic radical of the group consisting of alkyls of 1–5 carbon atoms, phenyl and tolyl. Suitable organic radicals which form phosphate esters include alkyls such as methyl, ethyl, β-chloroethyl, β-bromoethyl, β,β-dichloroethyl, β,β,β-trichloroethyl, propyl, isopropyl, β-chloropropyl, β-bromopropyl, β,γ-dichloropropyl, β,γ-dibromopropyl, β-bromo-γ-chloropropyl, β,β,γ,γ-tetrachloropropyl, butyl, isobutyl, sec.-butyl, β-chlorobutyl β-bromobutyl, and amyl and aromatics such as phenyl, chlorophenyl, bromophenyl, dichlorophenyl, trichlorophenyl, o-tolyl, m-tolyl, p-tolyl, chlorotolyl, bromotolyl, and dichlorotolyl as well as many others. These phosphate esters are readily prepared by various methods known to the art. They may be prepared from a phosphous oxyhalide and an aliphatic or aromatic alcohol in accordance with the equation:

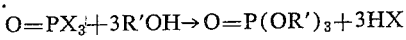

or from an aliphatic epoxide in accordance with the equation:

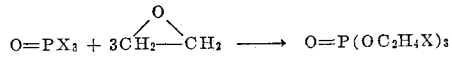

The transesterification of these simple phosphate esters forms a phosphorus-containing polyol and a by-product alcohol as illustrated by the following equation:

The products derived from the condensation of these phosphate esters are similar to those disclosed and claimed in a copending application of M. R. Lutz, G. Nowlin and H. Stange, Serial No. 137,521 filed September 12, 1961. These products are also useful in the preparation of flame-retardant polyurethane compositions.

The novel transesterification reaction of this invention is suitably conducted by stirring the high molecular weight polyol and the phosphate together at elevated temperatures. The temperature may vary over a wide range from about 50° C. to about 250° C. Preferably, temperatures of about 100–200° C. are employed. Atmospheric pressure, or reduced pressure may be employed. The reaction may be conducted under conditions at which the by-product glycol or alcohol is removed overhead during the reaction or the by-product may be removed by distillation of the reaction product. Reaction times of about 0.5–2 hours are generally encountered.

The viscosity of the phosphous-containing polyol should be less than about 4,000 poises to be suitable for preparing polyurethane compositions. When the viscosity is less than about 1,000 poises, the phosphorus, containing polyol is sufficiently fluid that it can be blended with a liquid polyisocyanate at room temperature. With viscosities in excess of about 1,000 poises, the phosphorus-containing polyol must be heated slightly to provide the desired degree of fluidity for blending. If the viscosity exceeds about 4,000 poises, the heat requirement for blending the phosphorus-containing polyol with the polyisocyanate will be such that they may react before they can be thoroughly blended.

The novel flame-retardant polyurethane compositions derived from novel phosphorus-containing polyols of this invention are the condensation products of 1 hydroxyl equivalent weight of phosphorus-containing polyol and at least about 1 isocyanate equivalent weight of an aromatic polyisocyanate; 1 hydroxyl group being equivalent to 1 isocyanate group. In practice, a slight excess of polyisocyanate, for example about 5%, is generally added to insure complete reaction. When water is used to generate the blowing agent for a polyurethane foam, larger excesses of polyisocyanate are used. Generally, about 1–1.5 isocyanates are present for each hydroxyl equivalent.

The aromatic polyisocyanate may be any of those conventionally used in the preparation of polyurethanes. Examples of suitable polyisocyanates include aromatic diisocyanates, such as 2,4 - tolylene diisocyanate, 2,6-tolylene diisocyanate, o-phenylene diisocyanate, m-phenylene diisocyanate, p-phenylene diisocyanate, 3,3' - bitolylene - 4,4' diisocyanate, methylene-p-diphenyl diisocyanate, methylene - 4,4' - bis(2-methylphenyl) diisocyanate, 1, 5 - naphthalene diisocyanate, 3,3' - dimethyl - 4,4' biphenylene diisocyanate, 3,3' - dimethoxy - 4,4' - biphenylene diisocyanate, and 2,2',5,5' - tetramethyl - 4,4' - biphenylene diisocyanate; higher aromatic polyisocyanates such as methylidyne-triphenyl triisocyanate and tolylene-2,4,6 - triisocyanate; and mixtures of any of these aromatic polyisocyanates.

A further and preferred class of polyisocyanates for the preparation of the novel flame-retardant polyurethane compositions disclosed herein includes chlorinated aromatic diisocyanates which contain at least about 25% by weight chlorine. Suitable aromatic diisocyanates which can be chlorinated include m-phenylene diisocyanate, p-phenylene diisocyanate, 2,4 - tolylene diisocyanate, 2,6-tolylene diisocyanate, 3,3' - dimethyl - 4,4' - biphenylene diisocyanate and methylene-p-diphenyl diisocyanate.

When employing a chlorinated aromatic diisocyanate, the phosphorus and halogen contents of the polyurethane compositions of this invention can be independently controlled by varying the phosphorus content of the transesterification product and the chlorine content of the chlorinated aromatic diisocyanate. Moreover, chlorinated aromatic diisocyanates are more reactive with the phosphorus-containing polyols of this invention than the corresponding unchlorinated diisocyanates. A particularly preferred class of chlorinated aromatic diisocyanate is chlorinated m-phenylene diisocyanate.

Chlorinated m-phenylene diisocyanate is readily prepared by reacting m-phenylene diisocyanate and chlorine at elevated temperatures with or without a catalyst. Suitable processes for chlorinating m-phenylene diisocyanate are fully disclosed by J. J. Tazuma in Patents Nos. 2,915,545 and 2,945,875. The chlorination reaction proceeds stepwise and thus can be terminated to form a product containing predominantly any desired degree of chlorination, that is, monochloro-, dichloro-, trichloro-, or tetrachloro-m-phenylene diisocyanate, or any adjacent mixture thereof.

Chlorinated m-phenylene diisocyanate is normally solid and must be warmed to form liquid which can be blended with the polyol component of the polyurethane composition. Although blending can be accomplished in this manner with normally solid diisocyanate, it is much simpler to use a liquid blend of chlorinated m-phenylene diisocyanate.

Chlorinated m-phenylene diisocyanate which is normally liquid at about room temperature can be prepared by blending chlorinated m-phenylene diisocyanate fractions which have been chlorinated to different degrees. For example, liquid mixtures containing 25–42% by weight chlorine are prepared by blending various amounts of dichloro-, trichloro-, and tetrachloro-m-phenylene diisocyanate. The liquid blend containing equal amounts of these three components has a chlorine content of about 39% by weight. The fluidity of chlorinated m-phenylene diisocyanate blends can be further improved by the addition of a fourth component such as unchlorinated m-phenylene diisocyanate, monochloro-m-phenylene diisocyanate, or another aromatic diisocyanate such as tolylene cyanate. These chlorinated m-phenylene diisocyanate liquid blends are fully disclosed by C. A. Erickson and D. Warren in their copending application, Serial No. 202,-100, filed June 13, 1962.

High exothermic heats of reaction may be avoided in the preparation of the polyurethane compositions of this invention by forming a phosphorus-containing polyol-polyisocyanate quasi-prepolymer containing residual isocyanate groups. This prepolymer is formed by reacting 1 equivalent weight of polyisocyanate with less than 1, for example 0.25, equivalent weight of phosphorous-containing polyol. The polyurethane composition is then prepared by reacting the prepolymer with sufficient additional phosphorus-containing polyol to provide the desired ratio of about 1 hydroxyl equivalent weight for each isocyanate equivalent weight.

The polyurethane compositions of this invention may be prepared using 1 or more phosphorus-containing polyols and 1 or more aromatic polyisocyanates. For example, the phosphorus-containing polyol component may be a blend of 2 or more different phosphorus-containing polyols, or 1 or more conventional high molecular weight polyols may be blended with 1 or more phosphorus-containing polyols. Similarly, the polyisocyanate component may be a blend of 2 or more aromatic polyisocyanates.

Although the degree of flame retardance of the polyurethane composition cannot always be accurately predicted from a knowledge of the phosphorus and halogen content, in most cases the flame retardance will vary in direct proportion to the phosphorus and halogen content. It has been found that changes in phosphorus content have a greater effect upon flame retardance than do changes in halogen content. It has also been found that halogen in the phosphorus-containing polyol has a greater effect than halogen in the diisocyanate. As a general rule, a polyurethane composition containing 1.75% phosphorus will be non-burning at a halogen content of about 22%. As the phosphorus content rises to 2.25% the halogen content requirement drops to about 17%, while at 3% phosphorus only 9% halogen is required for non-burning polyurethane compositions. In general, it has been found that the polyurethane compositions of this invention should contain at least about 5% halogen to possess satisfactory flame retardance. There are, however, exceptions to these general observations.

Although the burning characteristics of polyurethanes depend primarily on their composition, these characteristics are also affected by the physical form of the polyurethane composition, such as foam, coating, casting, etc. In the case of a foam, the burning characteristics are modified by such parameters as density, cell structure, and the composition of the gas within the cells.

The polyurethane compositions taught herein have useful applications as flame-retardant foams, surface coatings, castings and moldings. They are especially useful as rigid foams which can be used as flame-proof insulation materials for the building industry.

Foams are readily prepared by mixing together the phosphorus-containing polyol, an aromatic polyisocyanate and a blowing agent, such as a fluorinated hydrocarbon or water. As the reaction between the phosphorus-containing polyol and the polyisocyanate begins, the exothermic heat of reaction vaporizes the fluorinated hydrocarbon blowing agent with a resulting expansion of the reaction medium into a foam. When water is used as the blowing agent, it reacts with the polyisocyanate liberating carbon dioxide which expands the reaction medium. Small amounts of additional components such as catalysts and emulsifiers may be added, if desired, to alter the handling characteristics of the reaction mixture or the properties of the foam.

In the illustrative examples which follow, the flame-retardance of the polyurethane foams was measured in accordance with ASTM test method D1692–59T. Samples of the foam measuring 2 x 6 x ½ in. were marked by drawing lines 1 in. and 5 in. from 1 end of each sample. Thus, each sample was divided into 3 sections measuring 1 in., 4 in. and 1 in. A wing-tipped Bunsen burner flame was applied to 1 end of the sample until the burning reached the 1-in. line, or for a period of 1 min., whichever was shorter. If the 1-in. line was not reached by the burning, the sample was considered to be non-burning. If the sample burned beyond the 1-in. line and then went out before reaching the 5-in. line, it was rated as self-extinguishing.

The following examples, illustrating the novel phosphorus-containing polyols of this invention, novel flame-retardant polyurethane compositions derived therefrom, and the novel transesterification of phosphates with a high molecular weight polyol, are presented without any intention that the invention be limited thereto. All parts and percentages are by weight.

EXAMPLE 1

Tris(hydroxypropyl) phosphate was prepare as follows: Three hundred eighty parts of propylene oxide was added dropwise to 100 parts of 100% phosphoric acid over a period of 6 hrs. at a temperature of 50–60° C. The reaction mixture was quite viscous until about 40% of the propylene oxide had been added, after which the viscosity decreased. After the addition, stirring was continued for an additional 2 hrs. Excess propylene oxide remaining after this period was stripped off by vacuum at a pot temperature at 70° C. Four hundred twenty-one parts of product having an acid number of 2.5, a hydroxyl number of 363, and a phosphorus content of 7.5% was obtained. The tris(hydroxypropyl) phosphate contained 5.4 moles of propylene oxide for each mole of phosphoric acid.

A phosphorus-containing polyether polyol was prepared as follows: One hundred seventy-nine parts of the tris(hydroxypropyl) phosphate prepared above and 167 parts of a commercially available polyether polyol derived from the condensation of 1 mole of trimethylolpropane with 3 moles of propylene oxide were blended by stirring and heated up from 21–200° C. under 10 mm. Hg pressure over a 1.02-hr. period. Under these conditions, 56 parts of distillate, mainly dipropylene glycol, were collected. Two hundred ninety parts of phosphorus-containing polyether polyol having an acid number of 3.2, a hydroxyl number of 264 and a molecular weight of 620 (measured by vapor pressure osmometer in chloroform solvent) was obtained.

A polyurethane foam was prepared as follows: To 102 g. of the phosphorus-containing polyether polyol prepared above was added 15 drops of triethylamine, 15 drops of stannous octoate, 1.0 g. of commercially available silicon emulsifier sold as L–520 by Union Carbide Corp., and 50 g. of trichlorofluoromethane and the mixture was blended together by stirring. To this blend was added 100 g. of quasi-prepolymer prepared by reacting the phosphorus-containing polyether polyol prepared above with chlorinated m-phenylene diisocyanate containing 39% chlorine to an NCO/OH ratio of 6/1 and the mixture was stirred at a high rate until creaming took place, after which the foam was allowed to rise. The foam was then cured in an oven for 20 min. at 100° C. The cured foam had fine cells and a density of 2.1 pounds per cubic foot, contained 2.8% phosphorus and 15.4% chlorine, and was non-burning.

EXAMPLE 2

Tris(hydroxyethyl) phosphate was prepared as follows: Thirty parts of ethylene oxide was added as a gas to 10 parts of 100% phosphoric acid under Dry Ice reflux over a period of 6 hrs. After the addition, stirring was continued for an additional 2 hrs. Excess ethylene oxide was stripped off under vacuum at a pot temperature of 70° C. The resulting product was 35 parts of tris(hydroxyethyl) phosphate having an acid number of 2.0 and a hydroxyl number of 569.

A phosphorus-containing polyether polyol was prepared as follows: One hundred ninety-one parts of the tris(hydroxyethyl) phosphate prepared above was reacted with 234 parts of a commercially available polyether polyol derived from the condensation of 6 moles of propylene oxide with 1 mole of sorbitol by heating-up from 23–178° C. at 8–10 mm. Hg over a period of 1.08 hrs. The resulting product was 356 parts of a phosphorus-containing polyether polyol having an acid number of 4.5 and a hydroxyl number of 429.

A polyurethane foam was prepared as follows: To 67 g. of the phosphorus-containing polyether polyol prepared above was added 15 drops of triethylamine, 15 drops of stannous octoate, 1 g. of silicon emulsifier, and 50 g. of trichlorofluoromethane and the mixture was blended by stirring. To this blend was added 100 g. of a quasi-prepolymer prepared by reacting a commercially available polyether polyol derived from 6 moles of polyether propylene and 1 mole of sorbitol with chlorinated m-phenylene diisocyanate containing 39% chlorine to an NCO/OH ratio of 6/1. The mixture was stirred at a high rate for 29 sec., after which creaming took place and the foam was allowed to rise. The foam was then cured for 20 min. at 100° C. The resulting foam had fine cells, a density of 2.4 and was self-extinguishing.

EXAMPLE 3

Tris(hydroxypropyl) phosphate was prepared as follows: Thirty-two parts of 100% phosphoric acid was prepared by adding 22.9 parts of 85% phosphoric acid to 9.05 parts of phosphorus pentoxide. This was charged to a stainless steel reactor and 125 parts of propylene oxide were added over a period of 5 hrs. while maintaining the temperature in the range of 71–82° C. The batch was cooled to 38° C. and allowed to stand overnight. Excess propylene oxide was stripped from the product at 65–85° C. and 5 mm. Hg. The yield was 80% of theoretical of a product having an acid number of 1.0, a hydroxyl number of 370 and a phosphorus content of 7.30%.

A phosphorus-containing polyether polyol was prepared as follows: One hundred seventy parts of the tris(hydroxypropyl) phosphate prepared above was reacted with 246 parts of a commercially available polyether polyol derived from the condensation of 1 mole of sorbitol with 6 moles of propylene oxide by heating-up from 25–186° C. at 10 mm. Hg over a period of 0.92 hr. with stirring. The resulting product contained 363 parts of phosphorus-containing polyether polyol having an acid number of 1.8, a hydroxyl number of 378 and a molecular weight of 715.

A polyurethane foam was prepared as follows: To 81 g. of the phosphorus-containing polyether polyol prepared above was added 15 drops of triethylamine, 15 drops of stannous octoate, 1 g. of a silicon emulsifier, and 50 g. of trichlorofluoromethane and the mixture was blended by stirring. To this blend was added 100 g. of the quasi-prepolymer described in Example 2 and the mixture was stirred at a high rate for 23 sec., after which creaming took place and the foam was allowed to rise. The foam was then cured for 20 min. at 100° C. The resulting foam had fine cells, a density of 2.3 and was self-extinguishing.

EXAMPLE 4

Tris(hydroxypropyl) phosphate was prepared as follows: Three hundred eighty parts of propylene oxide was added dropwise to 100 parts of 100% phosphoric acid and 500 parts of dioxane over a period of 6 hrs. at a temperature of 50–60° C. After the addition, stirring was continued for an additional 2 hrs. The resulting product had a hydroxyl number of 490.

A phosphorus-containing polyether polyol was prepared as follows: One hundred ninety-four parts of the tris(hydroxypropyl) phosphate prepared above was reacted with 230 parts of a commercially available polyether polyol derived from the condensation of 1 mole of pentaerythritol with 8 moles of propylene oxide and having a hydroxy number of 374 by heating up from 19–192° C. at 10 mm. Hg over a period of 1.17 hrs. with stirring. The resulting product contained 363 parts of phosphorus-containing polyether polyol having an acid number of 2.0, a hydroxyl number of 280 and a molecular weight of 596.

A polyurethane foam was prepared as follows: To 102 g. of the phosphorus-containing polyether polyol prepared above was added 15 drops of triethylamine, 15 drops of stannous octoate, 1 g. of a silicon emulsifier, and 50 g. of trichlorofluoromethane and the mixture was blended by stirring. To this blend was added 100 g. of the quasi-prepolymer described in Example 2 and the mixture was stirred at a high rate for 20 sec., after which creaming took place and the foam was allowed to rise. The foam was then cured for 20 min. at 100° C. The resulting foam had fine cells, a density of 2.3 and was self-extinguishing.

EXAMPLE 5

Tris(hydroxychloropropyl) phosphate was prepared as follows: Sixty-one parts of epichlorohydrin was added dropwise to 10 parts of 100% phosphoric acid over a period of 6 hrs. at a temperature of 50–60° C. After the addition, stirring was continued for an additional 2 hrs. Excess epichlorohydrin was stripped off under vacuum at a pot temperature of 150° C. The resulting product was 63 parts of tris(hydroxychloropropyl) phosphate having an acid number of 3.0 and a hydroxyl number of 330.

A phosphorus-containing polyether polyol was prepared as follows: One hundred ninty-one parts of the tris(hydroxychloropropyl) phosphate prepared above was reacted with 209 parts of a commercially available polyether polyol derived from the condensation of 1 mole of pentaerythritol with 4.5 moles of propylene oxide and having a hydroxyl number of 550 by heating-up from 68–186° C. at a pressure of 10 mm. Hg over a 1-hr. period. The resulting product was 336 parts of phosphorus-containing polyether polyol having an acid number of 2.8 and a hydroxyl number of 420.

A polyurethane foam was prepared as follows: One hundred parts of the phosphorus-containing polyether polyol, 30 parts of trichlorofluoromethane, 1.0 part of triethylenediamine, 1.0 part of dimethylethanolamine, and 1.0 part of silicone emulsifier were blended together by stirring. To the blend was added 102 parts of chlorinated m-phenylene diisocyanate containing 39% chlorine. The mixture was stirred at a high rate until creaming took place, after which the foam was allowed to rise. The foam was cured in an oven for 2 hrs. at 80° C. The foamed product had a density of 2.2 and was non-burning.

EXAMPLE 6

A polyester polyol was prepared as follows: Two hundred parts of succinic acid, 404 parts of sebacic acid and 970 parts of trimethylolpropane were blended in a flask and the temperature was gradually raised over a 3-hr. period to 150° C. at which temperature the water formed in the reaction was distilled off. The temperature was maintained at 150–170° C. for an additional 19 hrs., after which all remaining water was removed by vacuum. The resulting polyester polyol had an acid number of 0 and a hydroxyl number of 544.

A phosphorus-containing polyester polyol was prepared as follows: Forty-eight parts of the tris(hydroxypropyl) phosphate prepared in Example 1 was reacted with 55 parts of the polyester polyol prepared above following the procedure of Example 1. The resulting phosphorus-containing polyester polyol had a hydroxyl number of 301 and contained 3.6% phosphorus.

A polyurethane foam was prepared as follows: One hundred parts of the phosphorus-containing polyester polyol, 30 parts of trichlorofluoromethane, 0.75 parts of stannous octoate, 0.5 part of 1,4-bis(2-hydroxypropyl)-2-methylpiperazine, and 1.0 part of silicone emulsifier were blended together by stirring. To the blend was added 88 parts of chlorinated m-phenylene diisocyanate containing 39% chlorine. The mixture was stirred at a high rate until creaming took place, after which the foam was allowed to rise. The foamed product had a density of 2.0 and was self-extinguishing.

EXAMPLE 7

A phosphorus-containing polyester polyol was prepared as follows: Thirty-four parts of the tris(hydroxypropyl) phosphate prepared in Example 1 was reacted with 50 parts of a commercially available hydroxyl-terminated polyester polyol derived from adipic acid and trimethylolethane and having a hydroxyl number of 430 following the procedure of Example 1. The resulting phosphorus-containing polyester polyol had a hydroxyl number of 243 and contained 3.1% phosphorus.

A polyurethane foam was prepared as follows: One hundred parts of the phosphorus-containing polyester polyol, 40 parts of trichlorofluoromethane, 0.55 part of dibutyltin di-2-ethylhexoate, and 0.7 part of silicone emulsifier were blended together by stirring. To the blend was added 63 parts of chlorinated m-phenylene diisocyanate containing 40% chlorine. The mixture was stirred at a high rate until creaming took place, after which the foam was allowed to rise. The foamed product had a density of 2.2 and was self-extinguishing.

EXAMPLE 8

A phosphorus-containing polyester polyol was prepared as follows: Forty-eight parts of the tris(hydroxypropyl) phosphate prepared in Example 1 was reacted with 48 parts of a commercially available hydroxyl-terminated polyester derived from chlorendic acid known as Hetrofoam 190 following the procedure of Example 1. The resulting phosphorus-containing polyester polyol had a hydroxyl number of 215 and a phosphorus content of 4%.

A polyurethane foam was prepared as follows: One hundred parts of the phosphorus-containing polyester polyol, 30 parts of trichlorofluoromethane, 0.25 part of stannous octoate, and 1.0 part of silicone emulsifier were blended together by stirring. To the blend was added 60 parts of chlorinated m-phenylene diisocyanate containing 39% chlorine. The mixture was stirred at a high rate until creaming took place, after which the foam was allowed to rise. The foamed product had a density of 2.1 and was self-extinguishing.

EXAMPLE 9

A phosphorus-containing polyether polyol was prepared as follows: Seventy-two parts of the tris(hydroxypropyl) phosphate prepared in Example 1 was reacted with 45 parts of a commercially available polyether polyol derived from the condensation of 1 mole of sucrose with 8 moles of propylene oxide following the procedure of Example 1. The resulting phosphorus-containing polyether polyol had a hydroxyl number of 203 and a phosphorus content of 5.5%.

A polyurethane foam was prepared as follows: Eighty parts of the phosphorus-containing polyether polyol derived from sucrose, 20 parts of the phosphorus-containing polyol prepared in Example 4, 30 parts of trichlorofluoromethane, 0.25 part of stannous octoate, 0.25 part of N-methylmorpholine, and 1.0 part of silicone emulsifier were blended together by stirring. To the blend was added 58 parts of chlorinated m-phenylene diisocyanate containing 39% chlorine. The mixture was stirred at a high rate until creaming took place, after which the foam was allowed to rise. The foamed product had a density of 2.2 and was self-extinguishing.

EXAMPLE 10

Tris(chloroethyl) phosphate was prepared as follows: An excess of ethylene oxide was added to 506 parts of phosphorus oxychloride with 3 parts of $TiCl_4$ catalyst. The temperature was maintained at 50° C. by a Dry Ice bath. The product was treated with 36 parts of $CaCO_3$ and 90 parts of water for 3.5 hrs. and filtered. The resulting tris(chloroethyl) phosphate had an acid number of 0.6.

A high molecular weight polyol was transesterified as follows: One hundred twenty parts of the tris(chloroethyl) phosphate prepared above, 150 parts of a commercially available polyether polyol derived from the condensation of 1 mole of sorbitol with 6 moles of propylene oxide, and 1 part of potassium methoxide were blended by stirring and heated at 135–182° C. under 33–41 mm. Hg pressure for 1.05 hrs. The resulting phosphorus-containing polyol had an acid number of 9.2 and a hydroxyl number of 327 and contained 5.2% phosphorus and 11.9% chlorine.

EXAMPLE 11

A high molecular weight polyol was transesterified with triethylphosphate as follows: Triethyl phosphate (47.5 parts) was reacted with 179 parts of a commercially available polyether polyol derived from the condensation of 1 mole of sorbitol with 6 moles of propylene oxide at a temperature of 100° C. and a pressure of 40 mm. Hg for 1.3 hr. with stirring. The resulting product contained 211 parts of phosphorus-containing polyether polyol having an acid number of 0.9 and a hydroxyl number of 520 and containing 2.8% phosphorus.

As will be apparent to those skilled in the art, numerous additional variations and combinations of phosphorus-containing polyols and of flame-retardant polyurethane compositions derived therefrom may be made without departing from the spirit of the invention or the scope of the following claims.

I claim:
1. A phosphorus-containing polyol comprising the transesterification product of
 (1) a liquid polyol having an average molecular weight of 200–5,000 and containing an average of at least 3 hydroxyl groups per molecule, and
 (2) a tris(hydroxyalkyl) phosphate of the formula $O=P[O(RO)_nH]_3$ in which R is an alkylene radical of the group consisting of ethylene, propylene, chloropropylene, bromopropylene, and butene and $n$ is 1.4–2.5,
said transesterification product containing at least 2% by weight phosphorus and having a viscosity of less than 4,000 poises at 25° C.

2. A phosphorus-containing polyether polyol comprising the transesterification product of
 (1) a liquid polyether polyol having an average molecular weight of 200–5,000 derived from the reaction of
  (a) 1 hydroxyl equivalent weight of a polyol selected from the group consisting polyhydroxyalkanes of 3–6 hydroxyl groups and 3–6 carbon atoms, and carbohydrates selected from the class consisting of pentoses, hexoses, fructose, sucrose and dextrose, with
  (b) at least 1 equivalent weight of an alkylene oxide of 2–4 carbon atoms, and
 (2) a tris(hydroxyalkyl) phosphate of the formula
$$O=P[O(RO)_nH]_3$$
 in which R is an alkylene radical of the group consisting of ethylene, propylene, chloropropylene, bromopropylene, and butene and $n$ is 1.4–2.5,
said transesterification product containing at least 2% by weight phosphorus and having a viscosity of less than 4,000 poises at 25° C.

3. A phosphorus-containing polyether polyol comprising the transesterification product of
 (1) a liquid polyether polyol having an average molecular weight of 400–2,000 derived from the reaction of
  (a) 1 hydroxyl equivalent weight of a polyhydroxyalkane of 4–6 hydroxyl groups and 4–6 carbon atoms with
  (b) at least 1 equivalent weight of propylene oxide and
 (2) a tris(hydroxypropyl) phosphate of the formula
$$O=P[O(C_3H_6O)_nH]_3$$
 in which $n$ is 1.4–2.5,
said transesterification product containing at least 2% by weight phosphorus and having a viscosity of less than 1,000 poises at 25° C.

4. A phosphorus-containing polyester polyol comprising the transesterification product of
 (1) a liquid hydroxyl-terminated polyester having an average molecular weight of 200–5,000 derived from the reaction of
  (a) 1 carboxylic equivalent weight of a dicarboxylic acid selected from the class consisting of maleic, chloromaleic, dichloromaleic, succinic, adipic, phthalic, isophthalic, sebacic and chlorendic, with
  (b) more than 1, but not more than 2 hydroxyl equivalent weights of polyol of 2–4 hydroxyl groups,
   said polyester containing at least 3 hydroxyl groups per molecule and having an acid number of 0–20 and a hydroxyl number of 100–700, and
 (2) a tris(hydroxyalkyl) phosphate of the formula
$$O=P[O(RO)_nH]_3$$
 in which R is an alkylene radical of the group consisting of ethylene, propylene, chloropropylene, bromopropylene, and butene and $n$ is 1.4–2.5,
said transesterification product containing at least 2% by weight phosphorus and having a viscosity of less than 4,000 poises at 25° C.

5. A phosphorus-containing polyester polyol comprising the transesterification product of
 (1) a liquid hydroxyl-terminated polyester having an average molecular weight of 500–2,000 derived from the reaction of
  (a) 1 carboxyl equivalent weight of a dicarboxylic acid selected from the class consisting of maleic, chloromaleic, dichloromaleic, succinic, adipic, phthalic, isophthalic, sebacic and chlorendic, with
  (b) more than 1, but not more than 2, hydroxyl equivalent weights of a trihydroxyalkane,
   said polyester containing at least 4 hydroxyl groups per molecule and having an acid number of 0–10 and a hydroxyl number of 300–650, and
 (2) a tris(hydroxypropyl) phosphate of the formula
$$O=P[O(C_3H_6O)_nH]_3$$
 in which $n$ is 1.4–2.5,
said transesterification product containing at least 2% by weight phosphorus and having a viscosity of less than 1,000 poises at 25° C.

(References on following page)

References Cited

UNITED STATES PATENTS

| | | | |
|---|---|---|---|
| 2,728,790 | 12/1955 | Sroog | 260—982 |
| 2,866,774 | 12/1958 | Price | 260—77.5 |
| 2,875,230 | 2/1959 | Coover et al. | 260—982 |
| 2,900,408 | 8/1959 | Blazer et al. | 260—461 |
| 2,915,545 | 12/1959 | Tazuma | 260—77.5 |
| 2,929,800 | 3/1960 | Hill | 260—77.5 |
| 2,937,194 | 5/1960 | Schroeder et al. | 260—77.5 |
| 3,134,742 | 5/1964 | Wismer et al. | 260—77.5 |

FOREIGN PATENTS 772,486   4/1957   Great Britain.

CHARLES B. PARKER, *Primary Examiner*.

LEON J. BERCOVITZ, *Examiner*.

M. C. JACOBS, FRANK M. SIKORA, RICHARD L. RAYMOND, *Assistant Examiners*.

UNITED STATES PATENT OFFICE
CERTIFICATE OF CORRECTION

Patent No. 3,324,202                  June 6, 1967

Borivoj R. Franko-Filipasic

It is hereby certified that error appears in the above numbered patent requiring correction and that the said Letters Patent should read as corrected below.

Column 1, line 53, the formula should appear as shown below instead of as in the patent:

$$O=P[O(RO)_nH]_3$$

column 2, line 49, for "polymer" read -- polyether --; column 3, line 66, for that portion of the equation reading $H]_2$            read            $H]_3$ column 5, line 6, after "from" insert -- the --; column 6, line 10, for "cyanate" read -- diisocyanate --; column 7, line 39, for "at" read -- of --; column 11, line 69, after "consisting" insert -- of --.

Signed and sealed this 9th day of July 1968.

(SEAL)
Attest:

EDWARD M. FLETCHER, JR.            EDWARD J. BRENNER
Attesting Officer                 Commissioner of Patents